(12) United States Patent
Zhang (10) Patent No.: US 11,294,189 B2
(45) Date of Patent: Apr. 5, 2022

(54) METHOD AND DEVICE FOR POSITIONING HANDLE IN HEAD MOUNTED DISPLAY SYSTEM AND HEAD MOUNTED DISPLAY SYSTEM

(71) Applicant: Qingdao Pico Technology Co., Ltd., Shandong (CN)

(72) Inventor: Xiuzhi Zhang, Shangdong Prov (CN)

(73) Assignee: QINGDAO PICO TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/417,814

(22) PCT Filed: Dec. 26, 2019

(86) PCT No.: PCT/CN2019/128488
§ 371 (c)(1),
(2) Date: Jun. 24, 2021

(87) PCT Pub. No.: WO2020/135539
PCT Pub. Date: Jul. 2, 2020

(65) Prior Publication Data
US 2022/0043270 A1    Feb. 10, 2022

(30) Foreign Application Priority Data

Dec. 26, 2018 (CN) .......................... 201811599896.4

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G06F 3/014* (2013.01); *H01Q 1/276* (2013.01); *G02B 2027/014* (2013.01)

(58) Field of Classification Search
USPC ............................................................ 345/8
See application file for complete search history.

(56) References Cited

U.S. PATENT DOCUMENTS

2013/0265300 A1* 10/2013 Vardi ...................... G06F 3/014
345/419
2015/0258432 A1* 9/2015 Stafford .............. A63F 13/5255
463/32
(Continued)

FOREIGN PATENT DOCUMENTS

| CN | 103797864 A | 5/2014 |
|---|---|---|
| CN | 103856629 A | 6/2014 |

(Continued)

OTHER PUBLICATIONS

Chinese Search Report for Chinese Application No. 2018115998964 dated Dec. 26, 2018 (2 pages).
(Continued)

*Primary Examiner* — Chineyere D Wills-Burns
(74) *Attorney, Agent, or Firm* — Buchanan Ingersoll & Rooney PC (57) ABSTRACT

Positioning a handle in a head mounted display system, and a head mounted display system. A wireless radio frequency master device is used on a head mounted device in the head mounted display system to perform operations of pairing with a wireless radio frequency slave device of a first handle and a wireless radio frequency slave device of a second handle. An electromagnetic wave receiver is used to receive electromagnetic waves emitted by an electromagnetic wave emitter of the first handle and an electromagnetic wave emitter of the second handle and generate an induced electromotive force. And, calculating position and posture information corresponding to the first handle and information of position and posture corresponding to the second handle respectively, wherein the position and posture infor- (Continued)

mation includes position translation information and direction rotation information when the wearer wears the first handle or the second handle.

14 Claims, 3 Drawing Sheets (51) Int. Cl.
*G06F 3/01* (2006.01)
*H01Q 1/27* (2006.01)

(56) References Cited

U.S. PATENT DOCUMENTS

| | | | | |
|---|---|---|---|---|
| 2015/0318874 | A1* | 11/2015 | Donaldson | H04W 4/80 367/135 |
| 2016/0171771 | A1* | 6/2016 | Pedrotti | G02B 27/017 345/633 |
| 2016/0363997 | A1* | 12/2016 | Black | G06F 3/016 |
| 2016/0378176 | A1* | 12/2016 | Shiu | G06F 3/011 345/633 |
| 2017/0038897 | A1* | 2/2017 | Park | G06F 3/046 |
| 2017/0147279 | A1* | 5/2017 | Dobaj | G06F 3/0383 |
| 2017/0205880 | A1* | 7/2017 | Osman | A63F 13/212 |
| 2019/0155384 | A1* | 5/2019 | Fajt | A63F 13/212 |
| 2019/0369752 | A1* | 12/2019 | Ikeda | G02B 27/017 |

FOREIGN PATENT DOCUMENTS

| | | |
|---|---|---|
| CN | 105929367 A | 9/2016 |
| CN | 106200981 A | 12/2016 |
| CN | 106293101 A | 1/2017 |
| CN | 107533233 A | 1/2018 |
| CN | 107592657 A | 1/2018 |
| CN | 108170297 A | 6/2018 |
| CN | 109613983 A | 4/2019 |
| CN | 109633632 A | 4/2019 |
| CN | 107360633 B | 11/2020 |
| EP | 2353021 B1 | 3/2014 |

OTHER PUBLICATIONS

First Office Action in Chinese Application No. 201811599896.4 dated Feb. 6, 2020 with English translation (18 pages).
International Search Report (PCT/ISA/210) with translation and Written Opinion (PCT/ISA/237) with translation dated Mar. 27, 2020, by the Chinese Patent Office as the International Searching Authority for International Application No. PCT/CN2019/128488.

* cited by examiner

METHOD AND DEVICE FOR POSITIONING HANDLE IN HEAD MOUNTED DISPLAY SYSTEM AND HEAD MOUNTED DISPLAY SYSTEM

CROSS-REFERENCE TO RELATED APPLICATIONS

The present application is a U.S. National Stage entry under 35 U.S.C. § 371 based on International Application No. PCT/CN2019/128488, filed on Dec. 26, 2019, which claims priority to Chinese application No. 201811599896.4, titled "Positioning Method and Apparatus for Handles in Head-mounted Display System, and Head-mounted Display System", filed on Dec. 26, 2018, and entire contents of which are incorporated herein by reference.

TECHNICAL FIELD

The present disclosure relates to the technical field of head mounted display, in particular to a method and device for positioning a handle in a head mounted display system, and a head mounted display system.

BACKGROUND

With the gradual maturity of head mounted display technology, various technologies surrounding virtual display devices have also been rapidly developed, including virtual reality (VR), augmented reality (AR), and mixed reality (MR), etc. Among them, VR is to completely immerse users in the virtual world, AR is to add virtual information to the real environment to enhance the real environment, and MR is to mix the real world and the virtual world to generate a new visual environment which contains both physical entity and virtual information.

In the VR, AR or MR system, optical positioning solutions are typically used in positioning and tracking of the handle. Optical positioning solutions have the problem of being liable to be blocked. In order to solve this problem and achieve 6-degree-of-freedom (6DOF) spatial positioning, typically, multiple cameras or multiple light towers are arranged, and at the same time, multiple feature points are provided on the head mounted display (HMD) and the handle, so as to minimize blind spots. However, due to the influence of the angle of view and the like, the problem of blind spots cannot be fully solved, and the spatial positioning of the 6DOF motion of the hand is difficult to realize. Moreover, since the refresh rate of the spatial positioning data of the camera is low, the latency at the handle end is large, and the accuracy is poor in the edge of the field of view.

SUMMARY

The present disclosure provides a method and device for positioning a handle in a head mounted display system, and a head mounted display system, which solve the technical problem of being liable to be blocked in the optical positioning solutions, and realizes electromagnetic positioning based on electromagnetic signals from the handle end and the head mounted device end, thereby effectively reducing the jitter of position and posture data at the handle end and improving the spatial positioning accuracy of the handle.

According to an aspect of the present disclosure, a method for positioning a handle in a head mounted display system is provided, which comprises:

using a wireless radio frequency master device on a head mounted device in the head mounted display system to perform operations of pairing with a wireless radio frequency slave device of a first handle and a wireless radio frequency slave device of a second handle;

using an electromagnetic wave receiver on the head mounted device to receive electromagnetic waves emitted by an electromagnetic wave emitter of the first handle and an electromagnetic wave emitter of the second handle and generate an induced electromotive force; and calculating position and posture information corresponding to the first handle and information of position and posture corresponding to the second handle respectively according to the induced electromotive force to achieve positioning, wherein the position and posture information includes position translation information and direction rotation information when the wearer wears the first handle or the second handle and moves.

According to another aspect of the present disclosure, a device for positioning a handle in a head mounted display system is provided, which comprises:

a pairing module adapted to use a wireless radio frequency master device on a head mounted device in the head mounted display system to perform operations of pairing with a wireless radio frequency slave device of a first handle and a wireless radio frequency slave device of a second handle; and an electromagnetic positioning module adapted to use an electromagnetic wave receiver on the head mounted device to receive electromagnetic waves emitted by an electromagnetic wave emitter of the first handle and an electromagnetic wave emitter of the second handle and generate an induced electromotive force; and calculate position and posture information corresponding to the first handle and information of position and posture corresponding to the second handle respectively to achieve positioning according to the induced electromotive force, wherein the position and posture information includes position translation information and direction rotation information when the wearer wears the first handle or the second handle and moves.

According to yet another aspect of the present disclosure, a head mounted display system is provided, which comprises: a head mounted device, a first handle, and a second handle. The head mounted device comprises the device for positioning a handle in a head mounted display system according to the another aspect of the present disclosure.

In the method and device for positioning the handle in the head mounted display system and the head mounted display system according to the embodiments of the present disclosure, the head mounted device in the head mounted display system establishes a wireless radio frequency pairing with the first handle and the second handle, the electromagnetic waves respectively emitted by the electromagnetic wave emitter of the first handle and the electromagnetic wave emitter of the second handle are received by the electromagnetic wave receiver on the head mounted device, and the position translation information and direction rotation information corresponding to the first handle and the second handle are calculated according to the induced electromotive force, and thus the positioning is achieved. Thereby, by using the electromagnetic positioning solution, the problems of being liable to be blocked and poor positioning accuracy in the optical positioning solutions are solved; moreover, the latency of the 6DOF data at the handle end is reduced, and the spatial positioning accuracy of each handle is improved.

DETAILED DESCRIPTION

In order to make the objectives, technical solutions and advantages of the present disclosure clearer, embodiments will be further described in detail below with reference to the accompanying drawings. Obviously, the described embodiments are part of the embodiments, rather than all of the embodiments of the present disclosure. All other embodiments obtained by those of ordinary skill in the art based on the described embodiments without paying creative work shall fall within the protection scope of the present disclosure.

The design idea of the present disclosure is as follows. In the prior art, the positioning of the handle in the head mounted display system mostly adopts an optical approach such as using a camera or setting a light tower for positioning. Such technologies have problems of being liable to be blocked, difficult to realize the spatial positioning of 6DOF motion of the hand; moreover, there is the problem of the angle of view, so the positioning accuracy is poor. The embodiment of the present disclosure provides a method and device for positioning a handle in a head mounted display system, and a head mounted display system, in which the positioning is achieved by installing an electromagnetic wave emitter in each of the two handles, installing an electromagnetic wave receiver at the head mounted device end, and calculating the spatial position of each handle relative to the head mounted device end based on the electromagnetic wave signals emitted by the handle ends. On the one hand, by using the electromagnetic positioning, the problems of being liable to be blocked and being difficult to realize the positioning of 6DOF motion of the hand in the optical positioning solutions are solved, and the 6DOF data accuracy is improved. On the other hand, each handle is provided with an electromagnetic wave emitter. Compared with other electromagnetic positioning methods for a single handle, it satisfies the positioning requirements of dual-handle scenarios and is suitable for most game applications.

Figure 1:
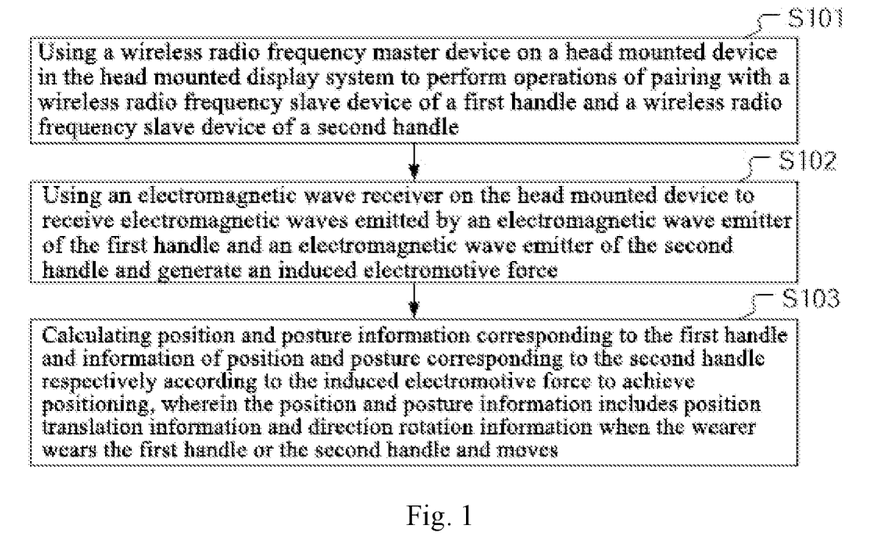
FIG. 1 is a flowchart of a method for positioning a handle in a head mounted display system according to an embodiment of the present disclosure.

FIG. 1 is a flowchart of a method for positioning a handle in a head mounted display system according to an embodiment of the present disclosure. Referring to FIG. 1, the method for positioning a handle in a head mounted display system of the present embodiment comprises the following steps:

Step S101, using a wireless radio frequency master device on a head mounted device in the head mounted display system to perform operations of pairing with a wireless radio frequency slave device of a first handle and a wireless radio frequency slave device of a second handle;

Step S102, using an electromagnetic wave receiver on the head mounted device to receive electromagnetic waves emitted by an electromagnetic wave emitter of the first handle and an electromagnetic wave emitter of the second handle and generate an induced electromotive force; and Step S103, calculating position and posture information corresponding to the first handle and information of position and posture corresponding to the second handle respectively to achieve positioning according to the induced electromotive force, wherein the position and posture information includes position translation information and direction rotation information when the wearer wears the first handle or the second handle and moves.

As shown in FIG. 1, in the positioning method of the handle in the head mounted display system, the head mounted device in the head mounted display system establishes a pairing connection with the radio frequency slave device of each of the two handles, the electromagnetic waves emitted by the electromagnetic wave emitters in the handles are received by the electromagnetic wave receiver on the head mounted device, and the position and direction of the handles relative to the head mounted device are calculated according to the electromagnetic waves received, and thus the positioning of handles is achieved. Thereby, by using the electromagnetic positioning, the problem of being liable to be blocked in the optical positioning process is solved. Moreover, an electromagnetic wave emitter is provided in each of the two handles, which is beneficial to improving the positioning accuracy of 6DOF motion of the handle.

As stated above, in the present embodiment, there are a first handle and a second handle which can be worn on the wearer's left and right hands respectively. The dual-handle design meets the requirements of most dual-handle game applications on a PC (personal computer). However, in order to realize the positioning of two handles using electromagnetic waves, it is necessary to solve the problem of mutual interference between emitters in the design including two emitters and one receiver.

The technical means for solving the mutual interference between emitters adopted in the embodiment of the present disclosure will be described below with reference to FIG. 2.

In general, the embodiments of the present disclosure eliminate the mutual interference by automatically controlling two emitters to operate at different emission frequencies (i.e., frequency-hopping), and distinguish two handles by different device numbers and different data transmission latencies.

Before the head mounted device and the handle start to interact, pairing is a necessary process. The pairing state is explained first here. Specifically, the embodiment of the present disclosure uses the wireless radio frequency master device on the head mounted device in the head mounted display system to perform the operation of pairing with the wireless radio frequency slave device of the first handle and the wireless radio frequency slave device of the second handle.

Figure 2:
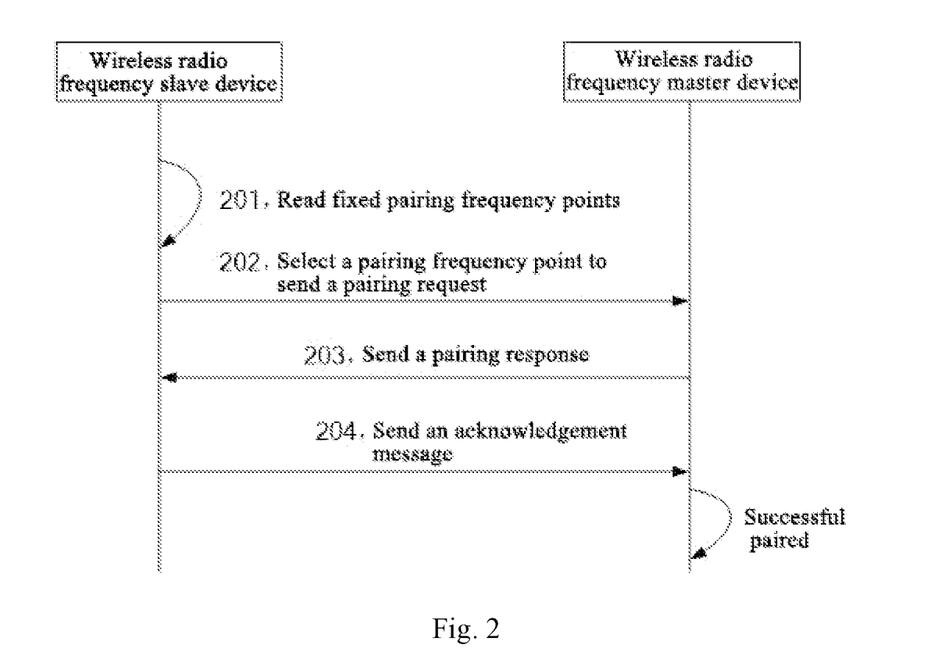
FIG. 2 is a schematic diagram of a pairing process according to an embodiment of the present disclosure.

Referring to FIG. 2, it should be noted that since both the first handle and the second handle are provided with the wireless radio frequency slave device, and the two handles are substantially the same in structure, the wireless radio frequency slave device in FIG. 2 can be either the wireless radio frequency slave device in the first handle or the wireless radio frequency slave device in the second handle. Here, the first handle is taken as an example for description. The wireless pairing process is as follows.

The wireless radio frequency slave device performs step S201 to read the fixed pairing frequency points.

It should be noted that, in the present embodiment, N (e.g., N=5) frequency points are selected in advance from multiple different frequency points in the 2.4G frequency band, and these N frequency points are taken as fixed pairing frequency points used in pairing and saved in the programs of the head mounted device and the handle. After the handle and the head mounted device enter the pairing state, these fixed pairing frequency points are first read to perform pairing.

The wireless radio frequency slave device performs step S202 to select a pairing frequency point to send a pairing request.

For example, the wireless radio frequency slave device of the first handle selects a channel from 5 fixed pairing frequency points to send a pairing request, and the pairing request includes the device address of the slave device.

It should be noted that the specific pairing process of the present embodiment is as follows. The handle is set to send a pairing request every 2 ms on the selected channel. After the head mounted device enters the pairing state, it also selects a channel from 5 fixed pairing frequency points to detect a pairing request. If the pairing request has not been detected in 4 ms, it will skip to the next pairing channel and continue to detect for 4 ms. Therefore, it takes the head mounted device at most 20 ms on the channels corresponding to the 5 fixed pairing frequency points until it detects a pairing request. After the handle and the head mounted device complete the synchronization of the working channels, they continue to complete the pairing process according to the 4 ms frequency-hopping logic. Therefore, the embodiment of the present disclosure has a good anti-interference ability.

The wireless radio frequency master device performs step S203 to send a pairing response.

The wireless radio frequency master device on the head mounted device receives the pairing request of the first handle, saves the device address of the wireless radio frequency slave device into the local cache (flash area) and sends a pairing response to the first handle. The pairing response includes: a device address of the wireless radio frequency master device, a list of frequency-hopping points, and a device number that uniquely identifies the slave device. It should be noted here that, in order to improve the anti-interference ability during data communication, the head mounted device of the embodiment of the present disclosure predetermines a frequency-hopping frequency point list including multiple different frequency points in the 2.4G frequency band for use in frequency-hopping during subsequent data communication.

Here, determining the frequency-hopping frequency point list including multiple different frequency points in the 2.4G frequency band comprises: dividing the frequency points in the 2.4G frequency band into multiple groups, selecting one frequency point without interference from each group as the center frequency point and saving it, taking the center frequency points of the respective groups as the frequency-hopping frequency points and ranking them in order (e.g., from small to large), and thus obtaining the frequency-hopping frequency point list. For example, 80 frequency points (except the pairing frequency points) in the 2.4G band are divided into 5 groups; a clean frequency point (i.e., a frequency point without interference) is selected from each group as the carrier frequency of signal transmission, i.e., the center frequency points; the 5 center frequency points of the 5 groups are taken as the frequency points for frequency-hopping in the subsequent data communication and are ranked in order, and thus the frequency-hopping frequency point list is obtained.

The device number here is an identity assigned by the master device to distinguish two slave devices. For example, the device number of the wireless radio frequency slave device of the first handle is 1, and the device number of the wireless radio frequency slave device of the second handle is 2. The device number can be used to distinguish which handle it is, and then the two handles can be automatically controlled to send data to the head mounted device with different latencies. For example, the first handle has a latency of 100 μs and the second handle has a latency of 300 μs to avoid interference between data of two handles.

The wireless radio frequency slave device performs step S204 to send an acknowledgement message.

After the wireless radio frequency slave device receives the pairing response, it saves the pairing information in the pairing response, and sends a acknowledgement message, i.e., an ACK message, to the wireless radio frequency master device.

The wireless radio frequency master device receives the acknowledgement message sent after the first handle saves the pairing information, and determines that the pairing with the first handle is successful.

It should be noted that, in the present embodiment, the pairing is performed in sequence, that is, the pairings of the two handles with the head mounted device are not completed at the same time. The wireless radio frequency master device on the head mounted device can be paired with the wireless radio frequency slave device of the first handle first, and after the pairing is successful, it is paired with the wireless radio frequency slave device of the second handle. Of course, alternatively, the wireless radio frequency master device on the head mounted device can be paired with the wireless radio frequency slave device of the second handle first, and after the pairing is successful, it is paired with the wireless radio frequency slave device of the first handle. Please refer to the foregoing description for the specific process of pairing.

Till this point, the wireless radio frequency master device is successfully paired with the wireless radio frequency slave devices. After the pairing is successful, as each wireless radio frequency slave device has a device number, the head mounted device can distinguish which handle it is by using the device number, and then the two handles can be automatically controlled to send data to the head mounted device with different latencies to avoid interference between the data of two handles, thereby assisting the accurate positioning of two handles, and enhancing the competitiveness of product.

In actual use, multiple sets of devices may operate at the same time, causing mutual interference between the devices. In view of this, the head mounted device determines whether there is interference between the electromagnetic waves received. If there is interference, the wireless radio frequency master device sends update commands (e.g., switching the current operating frequency from 10 to 20) to the wireless radio frequency slave device of the first handle and the wireless radio frequency slave device of the second handle respectively, to update the operating frequencies of the electromagnetic wave emitters of the first handle and the second handle respectively.

That is to say, in this case, the interference of the electromagnetic signal is judged by the electromagnetic wave receiver end of the head mounted device. If there is interference, the command to update the electromagnetic wave emission frequency is sent to the handle end through the wireless radio frequency communication link. After receiving the command, the handle end updates the operating frequency of the electromagnetic wave emitter, thereby improving the accuracy of 6DOF data.

It can be seen from the above that, in the present embodiment, a wireless radio frequency pairing connection is established between the head mounted device and the handle, and it is detected in the head mounted device whether there is interference between the electromagnetic signals of the two electromagnetic wave emitters. If there is interference, it is informed to the handle end through the successfully paired wireless radio frequency channel to switch the operating frequency of the electromagnetic wave emitter, and control two handles to operate at different emission frequencies to reduce mutual interference, thereby solving the mutual interference problem of the design including two emitters and one receiver, and improving the positioning accuracy.

In an embodiment of the present disclosure, in order to ensure the accuracy and performance of 6DOF, in addition to using electromagnetic waves to locate the handle, the data collected by the inertial sensor is also used to compensate the handle positioning data. Specifically, in the present embodiment, each of the first handle and the second handle are also provided with an IMU (inertial measurement unit) sensor, which is also called inertial sensor and used to detect and measure acceleration, tilt, impact, vibration, rotation and multi-DOF motion. The data refresh rate of the IMU sensor is required to be above 200 Hz. In order to realize timely and accurate transmission of the IMU data of the handle to the head mounted device, the wireless RF (radio frequency) communication system composed of the wireless radio frequency master device of the head mounted device and the wireless radio frequency slave devices of the handle according to the embodiment of the present disclosure adopts a private protocol to ensure that the latencies in the first handle and the second handle in each data transmission are fixed and different (e.g., the first handle has a latency of 100 μs, the second handle has a latency of 300 μs), thereby reducing the interference between data and improving the positioning accuracy.

The communication process of the wireless RF (radio frequency) communication system is roughly as follows: the wireless radio frequency master device of the head mounted device periodically sends a first broadcast signal, and receives data returned by the wireless radio frequency slave device of the first handle and the wireless radio frequency slave device of the second handle that are successfully paired according to the broadcast signal; when the wireless radio frequency master device does not receive the data returned by any wireless radio frequency slave device within a preset time period, the wireless radio frequency master device sends a second broadcast signal, wherein the second broadcast signal includes the device number of the wireless radio frequency slave device that failed to return data so as to perform data retransmission.

Here, receiving data returned by the wireless radio frequency slave device of the first handle and the wireless radio frequency slave device of the second handle that are successfully paired according to the broadcast signal comprises: receiving a time stamp of emitting the electromagnetic wave, generated posture data and a time stamp of the posture data returned by the first handle that is successfully paired; and receiving a time stamp of emitting the electromagnetic wave, generated posture data and a time stamp of the posture data returned by the second handle that is successfully paired. It should be noted that, a time stamp is added to the electromagnetic wave data when the first handle or the second handle emits electromagnetic waves, and a time stamp is added to the IMU data when IMU data is generated based on the collected sensor data, and the synchronization of IMU data and electromagnetic wave data is realized in the form of time stamps.

It should be noted that, in the present embodiment, for each data frame, the head mounted device sends a broadcast signal twice, and the broadcast signal includes the device number of the slave device that needs to return data. The first broadcast requires all slave devices to return data. The second broadcast only requires the slave device that failed the first transmission to return data, so as to reduce power consumption and improve data processing efficiency. In one embodiment, each broadcast signal contains 10 bytes of information, including information such as the number of the slave device that needs to return data, system synchronization information, and system control commands. The response returned by the handle end contains 32 bytes of data, including IMU data, synchronization time stamp, electromagnetic data time stamp, etc. It should be noted that, the synchronization time stamp is used to synchronize the electromagnetic data and IMU data of the handle in the subsequent calculation of the position and posture of the handle.

Figure 3:
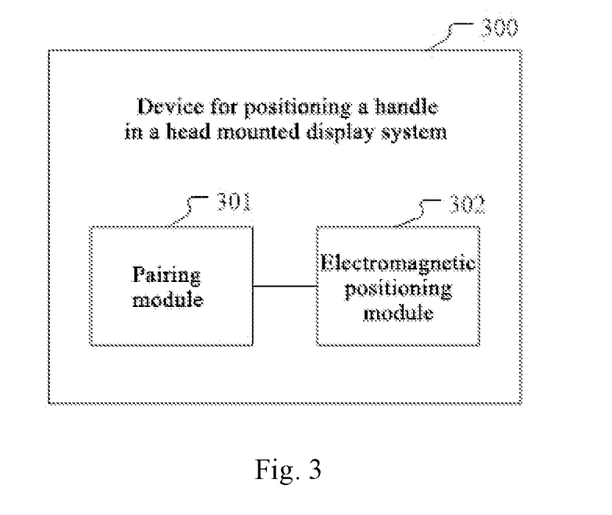
FIG. 3 is a diagram of the structure of a device for positioning a handle in a head mounted display system according to an embodiment of the present disclosure.

FIG. 3 is a diagram of the structure of a device for positioning a handle in a head mounted display system according to an embodiment of the present disclosure. Referring to FIG. 3, the device 300 for positioning a handle in a head mounted display system of the present embodiment comprises:

a pairing module 301 adapted to use a wireless radio frequency master device on a head mounted device in the head mounted display system to perform operations of pairing with a wireless radio frequency slave device of a first handle and a wireless radio frequency slave device of a second handle; and an electromagnetic positioning module 302 adapted to use an electromagnetic wave receiver on the head mounted device to receive electromagnetic waves emitted by an electromagnetic wave emitter of the first handle and an electromagnetic wave emitter of the second handle and generate an induced electromotive force; and calculate position and posture information corresponding to the first handle and information of position and posture corresponding to the second handle respectively to achieve positioning according to the induced electromotive force, wherein the position and posture information includes position translation information and direction rotation information when the wearer wears the first handle or the second handle and moves.

In an embodiment of the present disclosure, the pairing module 301 is specifically adapted to use the radio frequency master device on the head mounted device to receive a pairing request sent by the radio frequency slave device of the first handle or the second handle after selecting a pairing frequency point from N preset pairing frequency points, wherein the pairing request includes a device address of the slave device; save the device address of the slave device into a local cache according to the pairing request and send a pairing response to the first handle or the second handle, wherein the pairing response includes: a device address of the master device, a list of frequency-hopping frequency points, and a device number of the slave device which uniquely identifies the slave device, and wherein the list of frequency-hopping frequency points includes multiple frequency-hopping frequency points used for data communication in 2.4G band; use the radio frequency master device on the head mounted device to receive an acknowledgement message sent by the first handle or the second handle after saving the pairing information, and determine that the first handle or the second handle is successfully paired.

In an embodiment of the present disclosure, the device 300 for positioning the handle in the head mounted display system further comprises: a frequency-hopping module configured to use the head mounted device to judge whether there is interference between the electromagnetic waves received; and if there is interference, use the wireless radio frequency master device on the head mounted device to send update commands to the radio frequency slave device of the first handle and the radio frequency slave device of the second handle respectively, to update an operating frequency of the electromagnetic wave emitter of the first handle and an operating frequency of the electromagnetic wave emitter of the second handle respectively.

In an embodiment of the present disclosure, the device 300 for positioning the handle in the head mounted display system further comprises: a compensation module configured to, by the wireless radio frequency master device of the head mounted device, periodically send a first broadcast signal, and receive data returned by the wireless radio frequency slave device of the first handle and the wireless radio frequency slave device of the second handle that are successfully paired according to the broadcast signal; and when the wireless radio frequency master device does not receive the data returned by any wireless radio frequency slave device within a preset time period, send a second broadcast signal by the wireless radio frequency master device, wherein the second broadcast signal includes the device number of the wireless radio frequency slave device that failed to return data so as to perform data retransmission.

In an embodiment of the present disclosure, the compensation module is specifically configured to receive a time stamp of emitting the electromagnetic wave, generated posture data and a time stamp of the posture data returned by the first handle that is successfully paired; and receive a time stamp of emitting the electromagnetic wave, generated posture data and a time stamp of the posture data returned by the second handle that is successfully paired.

Figure 4:
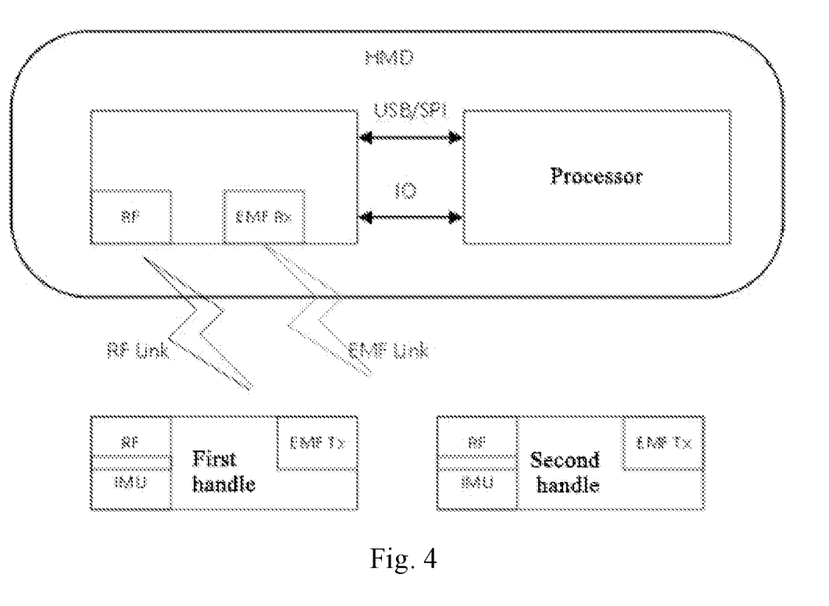
FIG. 4 is a schematic diagram of the principle of a head mounted display system according to an embodiment of the present disclosure.

In addition, an embodiment of the present disclosure also provides a head mounted display system. FIG. 4 is a schematic diagram of the principle of the head mounted display system according to an embodiment of the present disclosure. As shown in FIG. 4, the HMD (head mounted device) is provided with an RF (radio frequency, such as a 2.4G wireless radio frequency chip, used as a wireless radio frequency main device) and an electromagnetic wave receiver EMF Rx (EMF denotes electromagnetic field, R denotes receive, x denotes cross). The electromagnetic wave receiver EMF Rx is connected to the processor through a USB/SPI interface, and the electromagnetic positioning algorithm runs in the processor. The electromagnetic wave receiver EMF Rx receives the electromagnetic waves emitted by the electromagnetic wave emitters (i.e., EMF Tx in FIG. 4) of the first handle and the second handle through an electromagnetic link (i.e., EMF Link in FIG. 4).

The RF (2.4G wireless radio frequency chip) provided in the HMD communicates wirelessly with the RF (e.g., a 2.4G wireless radio frequency chip, used as a wireless radio frequency slave device) in the first handle through the radio frequency transmission link (i.e., RF Link), and communicates with the RF (e.g., a 2.4G radio frequency chip, used as a wireless radio frequency slave device) in the second handle through the wireless radio frequency transmission link (i.e., RF Link). In addition, as shown in FIG. 4, each of the first handle and the second handle of the present embodiment is further provided with an IMU sensor (i.e., IMU in FIG. 4) to collect posture data of the handle.

Figure 5:
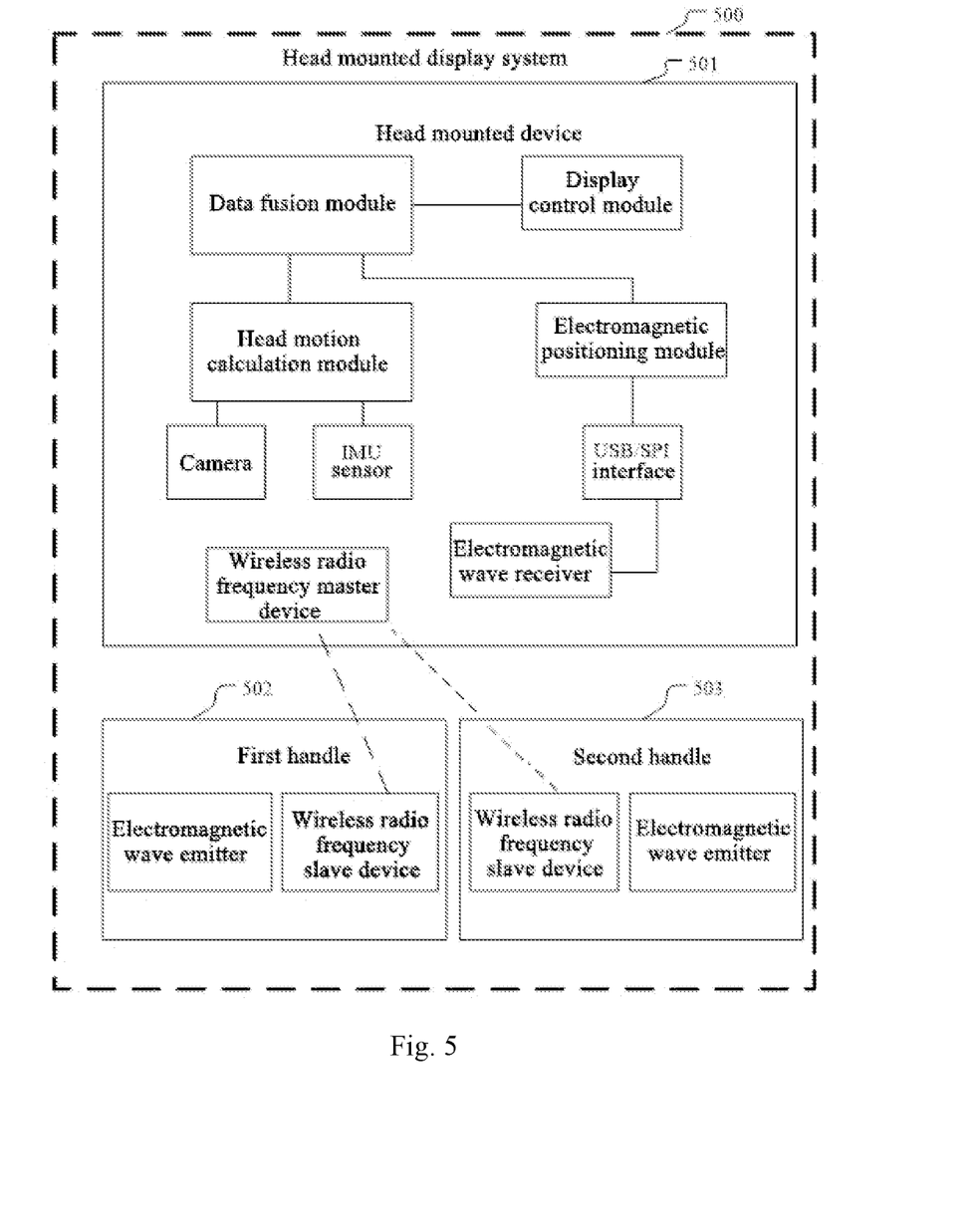
FIG. 5 is a block diagram of the structure of a head mounted display system according to an embodiment of the present disclosure.

In an embodiment, referring to FIG. 5 which is a block diagram of the structure of a head mounted display system according to an embodiment of the present disclosure, the head mounted display system 500 comprises a head mounted device 501, a first handle 502, and a second handle 503. The head mounted device 501 comprises the device for positioning a handle in a head mounted display system described above.

Specifically, the device for positioning a handle in a head mounted display system described above is applied to a head mounted device, and is composed of multiple modules in the head mounted device which cooperate to realize the positioning of the handle. Specifically, the head mounted device comprises a wireless radio frequency master device (e.g., a 2.4G wireless radio frequency chip), an electromagnetic wave receiver, a USB/SPI interface, and an electromagnetic positioning module. The wireless radio frequency master device performs the operation of pairing with the wireless radio frequency slave device (e.g., a 2.4G wireless radio frequency chip) of the first handle and the wireless radio frequency slave device (e.g., a 2.4G wireless radio frequency chip) of the second handle. The electromagnetic wave receiver receives electromagnetic waves emitted by the electromagnetic wave emitter of the first handle and the electromagnetic wave emitter of the second handle and generates an induced electromotive force, and sends the induced electromotive force to the electromagnetic positioning module through the USB or SPI interface. The electromagnetic positioning module calculates the position and posture information corresponding to the first handle and the information of position and posture corresponding to the second handle according to the induced electromotive force, and achieves positioning accordingly. Among them, the position and posture information includes position translation information and direction rotation information when the wearer wears the first handle or the second handle and moves, i.e., the 6DOF motion information of the hand.

As shown in FIG. 5, the head mounted device 501 is further provided with a motion sensor (a camera and an IMU sensor in FIG. 5), a head motion calculation module, a data fusion module, and a display control module. The head motion calculation module determines position translation information and direction rotation information when the wearer's head moves according to the motion data collected by the motion sensor. The data fusion module uses a data fusion algorithm to perform data fusion processing on the position translation information and direction rotation information when the wearer's head moves and position translation information and direction rotation information when the wearer wears the first handle or the second handle and moves, and obtain a fusion processing result. The display control module controls a display screen of the head mounted device according to the fusion processing result. Thereby, the head mounted device reads electromagnetic data and handle IMU data via a USB (Universal Serial Bus) or SPI (Serial Peripheral Interface) interface, calculates the relative position between the electromagnetic wave emitters and the electromagnetic wave receiver, and generates the 6DOF data fusion display of the hand and head on the head mounted device.

Referring to FIG. 5, each of the first handle 502 and the second handle 503 of the present embodiment is further provided with an IMU (inertial measurement unit) for collecting the posture data of the handle, which is used to collect the IMU data of the handle to compensate the electromagnetic data and increase the spatial positioning accuracy of the handle.

In sum, the method and device for positioning a handle in a head mounted display system and the head mounted display system according to the embodiments of the present disclosure solve the technical problem of being liable to be blocked in the optical positioning solutions, and realizes electromagnetic positioning based on electromagnetic signals from the handle end and the head mounted device end, thereby effectively reducing the jitter of position and posture data at the handle end and improving the spatial positioning accuracy of the handle.

Another embodiment of the present disclosure provides a computer-readable storage medium, and the computer-readable storage medium stores computer instructions, and the computer instructions cause a computer to execute the above method.

A person skilled in the art should understand that the embodiments of the present disclosure may be provided as a method, a system, or a computer program product. Thus, the present disclosure may take the form of an entirely hardware embodiment, an entirely software embodiment, or an embodiment combining software and hardware. Furthermore, the present disclosure may take the form of a computer program product embodied on one or more computer-usable storage media (including, but not limited to, disk storage, CD-ROM, optical memories, etc.) having computer-usable program code recorded thereon.

The present disclosure is described with reference to flowcharts and/or block diagrams of the method, the device (system), and the computer program product according to the embodiment of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing device to generate a machine so that a machine for implementing the functions specified in one or more flows of a flowchart or and/or one or more blocks of a block diagram can be generated by instructions executed by a processor of a computer or other programmable data processing device.

It should be noted that the terms "comprise", "include" or any other variations thereof are non-exclusive or open-ended, so that a process, method, article, or device including a series of elements includes not only those elements listed but also includes unspecified elements as well as elements that are inherent to such a process, method, article, or device. In the case that there is no more limitation, the phrase "comprising a . . . " does not exclude that the process, method, article, or device including the named element further includes additional named element.

In the description of the present disclosure, many specific details are illustrated. However, it can be understood that embodiments of the present disclosure may be practiced without these specific details. In some instances, well-known methods, structures and techniques have not been shown in detail in order not to obscure the understanding of this description. Similarly, it should be understood that in order to simplify the disclosure of the present disclosure and help understand one or more of the various inventive aspects, in the above description of exemplary embodiments of the present disclosure, various features of the present disclosure are sometimes grouped together in a single embodiment, diagrams, or description thereof. However, the disclosed method should not be interpreted as reflecting an intention that the claimed present disclosure requires more features than those expressly recited in each claim. More exactly, as the following claims reflect, inventive aspects include features less than all features of a single foregoing disclosed embodiment. Thus, the claims following the detailed description are hereby expressly incorporated into this detailed description, with each claim being an independent embodiment of the present disclosure.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

What is claimed is:

1. A method for positioning a handle in a head mounted display system, comprising:
   using a wireless radio frequency master device on a head mounted device in the head mounted display system to perform operations of pairing with a wireless radio frequency slave device of a first handle and a wireless radio frequency slave device of a second handle;
   using an electromagnetic wave receiver on the head mounted device to receive electromagnetic waves emitted by an electromagnetic wave emitter of the first handle and an electromagnetic wave emitter of the second handle and generate an induced electromotive force; and
   calculating position and posture information corresponding to the first handle and information of position and posture corresponding to the second handle respectively according to the induced electromotive force to achieve positioning, wherein the position and posture information includes position translation information and direction rotation information when the wearer wears the first handle or the second handle and moves.

2. The method according to claim 1, wherein using a wireless radio frequency master device on a head mounted device in the head mounted display system to perform operations of pairing with a wireless radio frequency slave device of a first handle and a wireless radio frequency slave device of a second handle comprises:
   using the wireless radio frequency master device on the head mounted device to receive a pairing request sent by the wireless radio frequency slave device of the first handle or the second handle after selecting a pairing frequency point from N preset pairing frequency points, wherein the pairing request includes a device address of the slave device;
   saving the device address of the slave device into a local cache according to the pairing request and sending a pairing response to the first handle or the second handle, wherein the pairing response includes: a device address of the master device, a frequency-hopping frequency point list, and a device number of the slave device which uniquely identifies the slave device, wherein the frequency-hopping frequency point list includes multiple frequency-hopping frequency points in 2.4G band used for data communication; and using the wireless radio frequency master device on the head mounted device to receive an acknowledgement message sent by the first handle or the second handle after saving the pairing information, and determining that the first handle or the second handle is successfully paired.

3. The method according to claim 2, further comprising:
judging, by the head mounted device, whether there is interference between the electromagnetic waves received; and
if there is interference, sending, by the wireless radio frequency master device on the head mounted device, update commands to the wireless radio frequency slave device of the first handle and the wireless radio frequency slave device of the second handle respectively, to update an operating frequency of the electromagnetic wave emitter of the first handle and an operating frequency of the electromagnetic wave emitter of the second handle respectively.

4. The method according to claim 1, further comprising:
using the wireless radio frequency master device of the head mounted device to periodically send a first broadcast signal, and receive data returned by the wireless radio frequency slave device of the first handle and the wireless radio frequency slave device of the second handle that are successfully paired according to the broadcast signal; and
when the wireless radio frequency master device does not receive the data returned by any wireless radio frequency slave device within a preset time period, using the wireless radio frequency master device to send a second broadcast signal, wherein the second broadcast signal includes the device number of the wireless radio frequency slave device that failed to return data so as to perform data retransmission.

5. The method according to claim 4, wherein receiving data returned by the wireless radio frequency slave device of the first handle and the wireless radio frequency slave device of the second handle that are successfully paired according to the broadcast signal comprises:
receiving a time stamp of emitting the electromagnetic wave, generated posture data and a time stamp of the posture data returned by the first handle that is successfully paired; and
receiving a time stamp of emitting the electromagnetic wave, generated posture data and a time stamp of the posture data returned by the second handle that is successfully paired.

6. A device for positioning a handle in a head mounted display system, comprising:
a pairing module adapted to use a wireless radio frequency master device on a head mounted device in the head mounted display system to perform operations of pairing with a wireless radio frequency slave device of a first handle and a wireless radio frequency slave device of a second handle; and
an electromagnetic positioning module adapted to use an electromagnetic wave receiver on the head mounted device to receive electromagnetic waves emitted by an electromagnetic wave emitter of the first handle and an electromagnetic wave emitter of the second handle and generate an induced electromotive force; and calculate position and posture information corresponding to the first handle and information of position and posture corresponding to the second handle respectively to achieve positioning according to the induced electromotive force, wherein the position and posture information includes position translation information and direction rotation information when the wearer wears the first handle or the second handle and moves.

7. The device according to claim 6, wherein the pairing module is specifically adapted to
use the wireless radio frequency master device on the head mounted device to receive a pairing request sent by the wireless radio frequency slave device of the first handle or the second handle after selecting a pairing frequency point from N preset pairing frequency points, wherein the pairing request includes a device address of the slave device;
save the device address of the slave device into a local cache according to the pairing request and send a pairing response to the first handle or the second handle, wherein the pairing response includes: a device address of the master device, a frequency-hopping frequency point list, and a device number of the slave device which uniquely identifies the slave device, and the frequency-hopping frequency point list includes multiple frequency-hopping frequency points in 2.4G band used for data communication; and
use the wireless radio frequency master device on the head mounted device to receive an acknowledgement message sent by the first handle or the second handle after saving the pairing information, and determine that the first handle or the second handle is successfully paired.

8. The device according to claim 6, further comprising:
a frequency-hopping module, configured to use the head mounted device to judge whether there is interference between the electromagnetic waves received; and if there is interference, use the wireless radio frequency master device on the head mounted device to send update commands to the wireless radio frequency slave device of the first handle and the wireless radio frequency slave device of the second handle respectively, to update an operating frequency of the electromagnetic wave emitter of the first handle and an operating frequency of the electromagnetic wave emitter of the second handle respectively.

9. A head mounted display system, comprising: a head mounted device, a first handle and a second handle, wherein the head mounted device comprises the device for positioning a handle in a head mounted display system according to claim 6.

10. The head mounted display system according to claim 9, wherein the head mounted device is further provided with a motion sensor, a head motion calculation module, a data fusion module, and a display control module, and the first handle and the second handle are further provided with an inertial measurement unit (IMU) for collecting handle posture data;
the head motion calculation module determines position translation information and direction rotation information when the wearer's head moves according to the motion data collected by the motion sensor;
the data fusion module uses a data fusion algorithm to perform data fusion processing on the position translation information and direction rotation information when the wearer's head moves and position translation information and direction rotation information when the wearer wears the first handle or the second handle and moves, and obtain a fusion processing result; and
the display control module controls a display screen of the head mounted device according to the fusion processing result.

11. The head mounted display system according to claim 9, wherein the pairing module is specifically adapted to use the wireless radio frequency master device on the head mounted device to receive a pairing request sent by the wireless radio frequency slave device of the first handle or the second handle after selecting a pairing frequency point from N preset pairing frequency points, wherein the pairing request includes a device address of the slave device;

save the device address of the slave device into a local cache according to the pairing request and send a pairing response to the first handle or the second handle, wherein the pairing response includes: a device address of the master device, a frequency-hopping frequency point list, and a device number of the slave device which uniquely identifies the slave device, and the frequency-hopping frequency point list includes multiple frequency-hopping frequency points in 2.4G band used for data communication; and     use the wireless radio frequency master device on the head mounted device to receive an acknowledgement message sent by the first handle or the second handle after saving the pairing information, and determine that the first handle or the second handle is successfully paired.

12. The head mounted display system according to claim 11, wherein the head mounted device is further provided with a motion sensor, a head motion calculation module, a data fusion module, and a display control module, and the first handle and the second handle are further provided with an inertial measurement unit (IMU) for collecting handle posture data;

the head motion calculation module determines position translation information and direction rotation information when the wearer's head moves according to the motion data collected by the motion sensor;

the data fusion module uses a data fusion algorithm to perform data fusion processing on the position translation information and direction rotation information when the wearer's head moves and position translation information and direction rotation information when the wearer wears the first handle or the second handle and moves, and obtain a fusion processing result; and     the display control module controls a display screen of the head mounted device according to the fusion processing result.

13. The head mounted display system according to claim 9, further comprising:

a frequency-hopping module, configured to use the head mounted device to judge whether there is interference between the electromagnetic waves received; and if there is interference, use the wireless radio frequency master device on the head mounted device to send update commands to the wireless radio frequency slave device of the first handle and the wireless radio frequency slave device of the second handle respectively, to update an operating frequency of the electromagnetic wave emitter of the first handle and an operating frequency of the electromagnetic wave emitter of the second handle respectively.

14. The head mounted display system according to claim 13, wherein the head mounted device is further provided with a motion sensor, a head motion calculation module, a data fusion module, and a display control module, and the first handle and the second handle are further provided with an inertial measurement unit (IMU) for collecting handle posture data;

the head motion calculation module determines position translation information and direction rotation information when the wearer's head moves according to the motion data collected by the motion sensor;

the data fusion module uses a data fusion algorithm to perform data fusion processing on the position translation information and direction rotation information when the wearer's head moves and position translation information and direction rotation information when the wearer wears the first handle or the second handle and moves, and obtain a fusion processing result; and     the display control module controls a display screen of the head mounted device according to the fusion processing result.

* * * * *